(12) United States Patent
Klamser et al.

(10) Patent No.: US 9,174,679 B2
(45) Date of Patent: Nov. 3, 2015

(54) VEHICLE WITH A DEFLECTION DEVICE, AND DEFLECTION DEVICE

(71) Applicant: Dr. Ing. h.c. F. Porsche Aktiengesellschaft, Stuttgart (DE)

(72) Inventors: Herbert Klamser, Korntal-Muechingen (DE); Xuan Li, Ditzingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/477,084

(22) Filed: Sep. 4, 2014

(65) Prior Publication Data

US 2015/0060181 A1  Mar. 5, 2015

(30) Foreign Application Priority Data

Sep. 4, 2013  (DE) .......................... 10 2013 109 630

(51) Int. Cl.
| | |
|---|---|
| *B62D 21/15* | (2006.01) |
| *B60R 19/16* | (2006.01) |
| *B60R 19/40* | (2006.01) |
| *B60R 21/00* | (2006.01) |
| *B62D 25/08* | (2006.01) |
| *B60R 19/00* | (2006.01) |

(52) U.S. Cl.
CPC .............. *B62D 21/152* (2013.01); *B60R 19/40* (2013.01); *B60R 19/16* (2013.01); *B60R 2019/007* (2013.01); *B60R 2021/0023* (2013.01); *B62D 25/085* (2013.01)

(58) Field of Classification Search
CPC .... B62D 21/152; B62D 21/155; B62D 21/15; B62D 25/082; B62D 25/085; B62D 25/08; B60R 19/34; B60R 19/16; B60R 19/24; B60R 19/14; B60R 19/26; B60R 19/04; B60R 2021/0023; B60R 2019/247; B60R 21/00; B60R 2019/007
USPC ............... 296/187.1, 187.09, 187.03, 203.02; 280/784; 180/274, 271, 312, 311; 293/150, 133, 132, 155, 149
See application file for complete search history.

(56) References Cited

U.S. PATENT DOCUMENTS

| | | |
|---|---|---|
| 7,819,218 B2 | 10/2010 | Eichberger et al. |
| 7,926,847 B2 | 4/2011 | Auer et al. |

(Continued)

FOREIGN PATENT DOCUMENTS

| | | |
|---|---|---|
| DE | 10060393 | 6/2002 |
| JP | 2013241032 | 12/2013 |

OTHER PUBLICATIONS

British Patent Appl. No. GB1415523.8—Combined Search and Examination Report—Feb. 19, 2015.

*Primary Examiner* — Keith Frisby
(74) *Attorney, Agent, or Firm* — Gerald E. Hespos; Michael J. Porco; Matthew T. Hespos

(57) ABSTRACT

Front longitudinal members (11) of a vehicle (10) extend forward from a passenger cell (12) and partially bound an engine compartment (13), in which a drive unit (14) is positioned. A deflection device (17) has deflection elements (18) fastened to the front longitudinal members (11) for rotation about vertical axes (24). In the event of a partially overlapping frontal collision with a barrier, the deflection element (18) is rotated by the collision from an inoperative position in which the deflection element extends in the longitudinal direction of the respective front longitudinal member (11), into a collision position where a first portion (19) of the deflection element (18) projects into the engine compartment (13). Thus, a longitudinal pulse from the frontal collision acting toward the passenger cell (12) is at least partially converted by the deflection element (18) into a transverse pulse acting on the drive unit (14).

9 Claims, 3 Drawing Sheets

(56) References Cited

U.S. PATENT DOCUMENTS

| | | |
|---|---|---|
| 8,353,380 B2 | 1/2013 | Schoenberger et al. |
| 8,544,589 B1 | 10/2013 | Rupp et al. |
| 2008/0023954 A1 | 1/2008 | Eichberger et al. |
| 2012/0248820 A1 | 10/2012 | Yasui et al. |
| 2013/0256051 A1 | 10/2013 | Nakamura et al. |
| 2013/0320709 A1 | 12/2013 | Kuwabara et al. |
| 2014/0091595 A1 | 4/2014 | Ramoutar et al. |
| 2015/0014084 A1* | 1/2015 | Iwama et al. ............ 180/312 |

* cited by examiner

VEHICLE WITH A DEFLECTION DEVICE, AND DEFLECTION DEVICE

CROSS REFERENCE TO RELATED APPLICATION

This application claims priority under 35 USC 119 to German Patent Appl. No. 10 2013 109 630.1 filed on Sep. 4, 2013, the entire disclosure of which is incorporated herein by reference.

BACKGROUND OF THE INVENTION

1. Field of the Invention

The invention relates to a deflection device and a vehicle with a deflection device.

2. Description of the Related Art

U.S. Pat. No. 7,819,218 and U.S. Pat. No. 8,353,380 each disclose a vehicle with a deflection device for a partially overlapping frontal collision of the vehicle with a barrier. The known deflection devices are intended to prevent a front wheel of the vehicle from penetrating a passenger cell of the vehicle in the event of a frontal collision with a partial overlap. The deflection device of U.S. Pat. No. 7,819,218 is activated by the collision. The deflection device of U.S. Pat. No. 8,353,380 is activated via a separate force source.

An object of the invention is to provide a novel vehicle and a novel deflection device.

SUMMARY OF THE INVENTION

The invention relates a deflection device with deflection elements fastened to front longitudinal members in a manner rotatable about a vertical axis of rotation. In the event of a partially overlapping frontal collision, a deflection element that is fastened rotatably in the region of a front longitudinal member is rotatable by collision with the barrier from an inoperative position to a collision position. In the inoperative position, the deflection element extends in the longitudinal direction of the respective front longitudinal member. In the collision position, the deflection element rotates relative to the respective front longitudinal member so that a first portion of the deflection element projects into the engine compartment. Thus, a longitudinal pulse caused by the frontal collision and acting in the longitudinal pulse acting in the direction of the passenger cell is converted at least partly into a transverse pulse acting on the drive unit. Thus, forces and moments acting on the passenger cell in the event of a collision can be reduced. Furthermore, the vehicle can be offset relative to the barrier by the transverse pulse. As a result, forces and moments acting on the passenger cell can be reduced further The respective front longitudinal member preferably has a closed wall in the region of the respective deflection element on the side facing the engine compartment. As a result, the respective deflection element, when displaced from the inoperative position into the collision position bears against the closed wall and deforms the respective front longitudinal member into the engine compartment in the transverse direction of the vehicle. The deformation of the respective front longitudinal member into the engine compartment permits a further reduction in the forces and moments acting on the passenger cell.

The deflection element is rotatable relative to the front longitudinal member out of the inoperative position into the collision position in such a manner that a second portion of the deflection element that is opposite the first portion of the deflection element projects in relation to the front longitudinal member on the side facing away from the engine compartment and forms a sliding surface for the barrier involved in the frontal collision. The sliding surface permits a defined sliding of the barrier on the respective deflection element and thus a further reduction of forces and moments acting on the passenger cell in the event of a collision.

The front longitudinal member may be of open design on the side facing away from the engine compartment in the region of the respective deflection element. A projection formed on the second portion of the respective deflection element projects in relation to the front longitudinal member on this side. When the barrier strikes against this projection, the respective deflection element is activated by the collision as such without the necessity of a separate force source.

Exemplary embodiments of the invention, without being restricted thereto, are explained in more detail with reference to the drawings.

DETAILED DESCRIPTION

Figure 1:
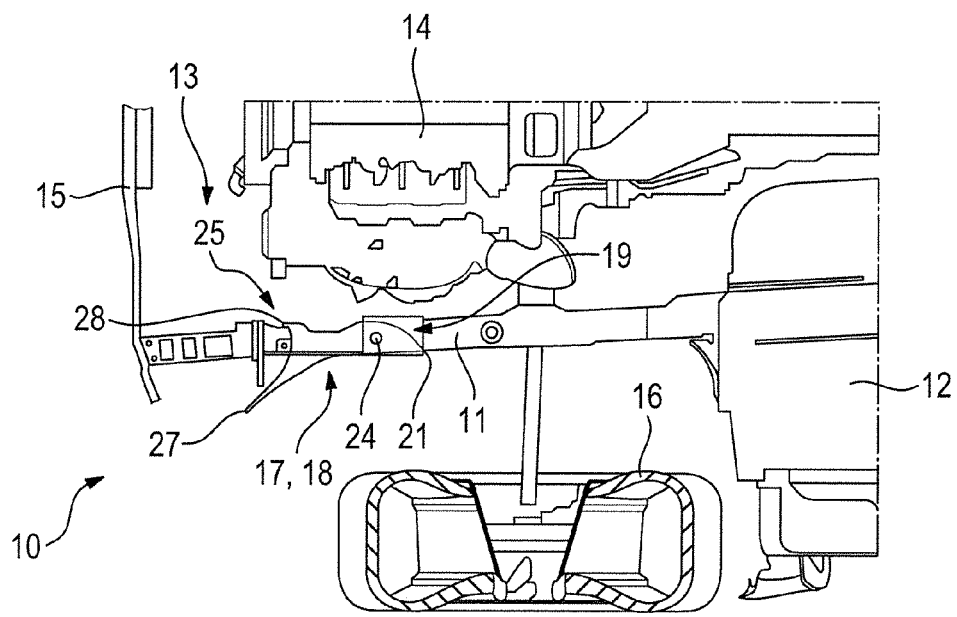
FIG. 1 is a cutout from a vehicle according to the invention with a deflection device according to the invention.
Figure 2:
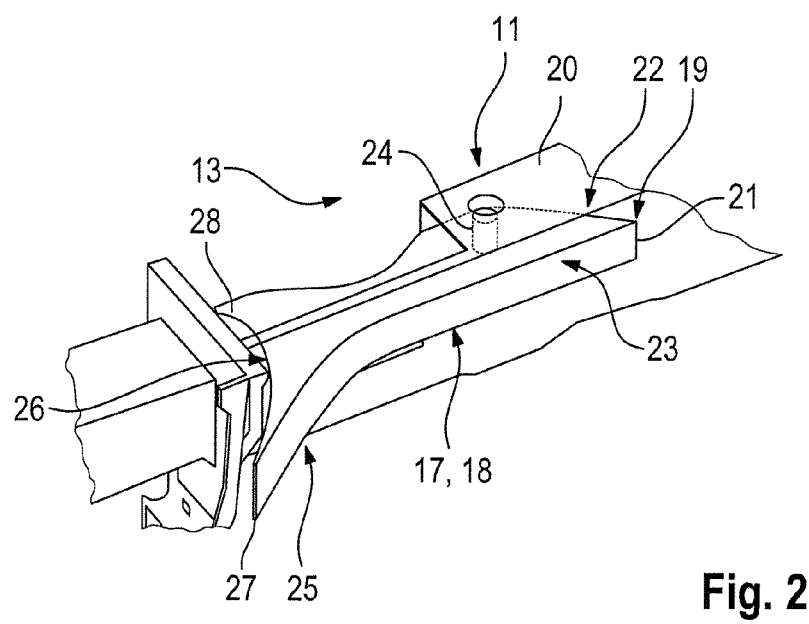
FIG. 2 is a detail from FIG. 1.

FIG. 1 shows a cutout from a vehicle 10 according to the invention in the region of a front longitudinal member 11 of a body shell of the vehicle 10. The front longitudinal member 11 extends longitudinally forward from a passenger cell 12. One such front longitudinal member 11 extends on either side of the vehicle 10, and the front longitudinal members together partially bound an engine compartment 13 of the vehicle. A drive unit 14 of the vehicle 10 is positioned in the engine compartment 13. A bumper 15 extends substantially in the transverse direction of the vehicle 10 and at the front on the front longitudinal members 11.

FIG. 1 also shows a front wheel 16 of the vehicle 10. The wheel 16 is positioned on a side of the front longitudinal member 11 that is remote from the engine compartment 13.

The vehicle 10 comprises a deflection device 17 for a partially overlapping frontal collision of the vehicle 10 with a barrier (not shown in the figures). The deflection device 17 has deflection elements 18 that are fastened rotatably to the front longitudinal members 11. In the illustrated embodiment, one such deflection element 18 is fastened in the region of each front longitudinal member 11 and is rotatable about a vertical axis of rotation 24.

Figure 3:
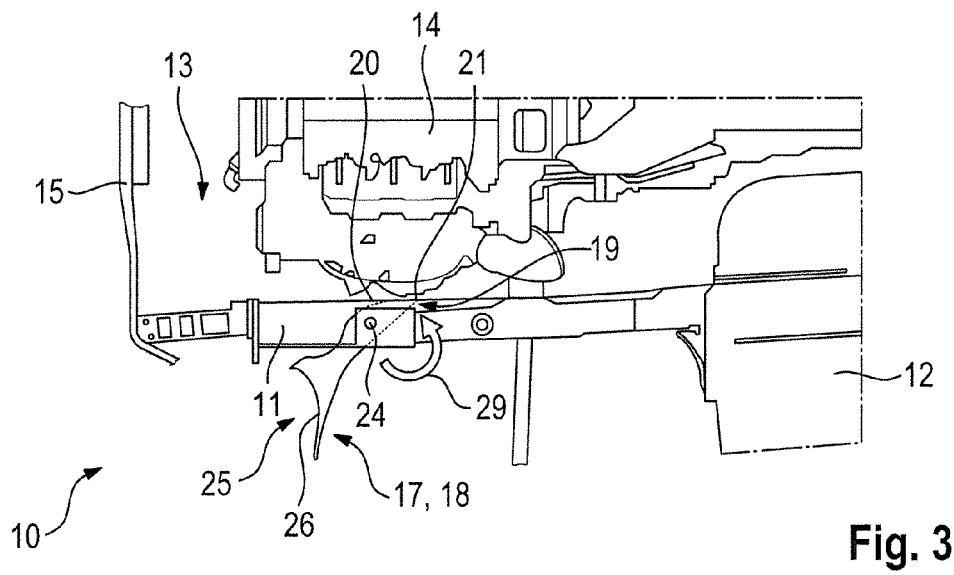
FIG. 3 is the cutout from FIG. 1 in a first state in the event of a partially overlapping frontal collision of the vehicle with a barrier.
Figure 4:
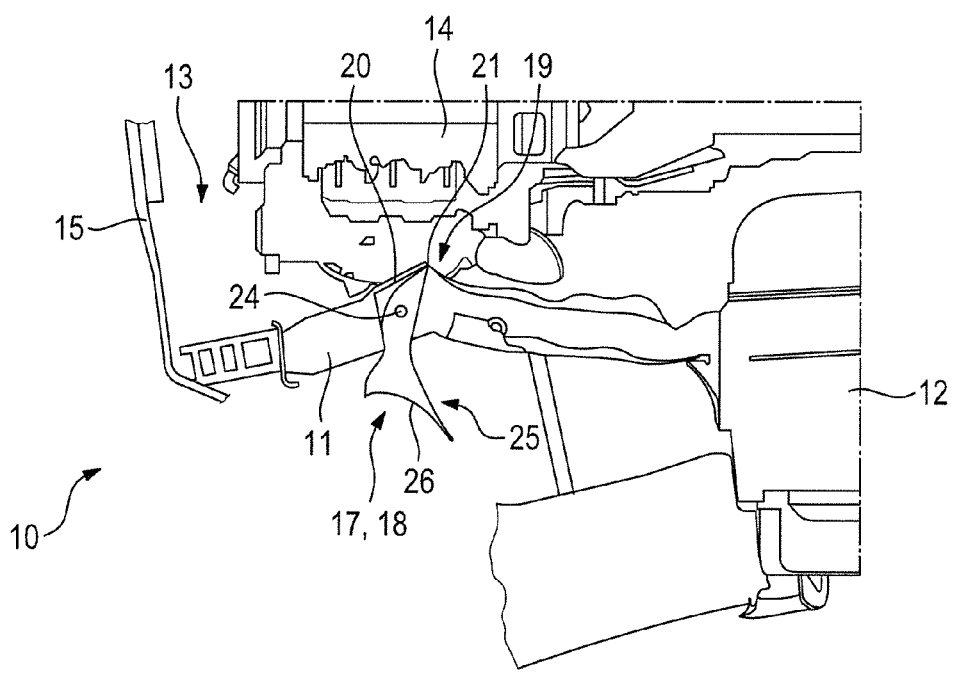
FIG. 4 is the cutout from FIG. 1 in a second state in the case of a partially overlapping frontal collision of the vehicle with a barrier.
Figure 5:
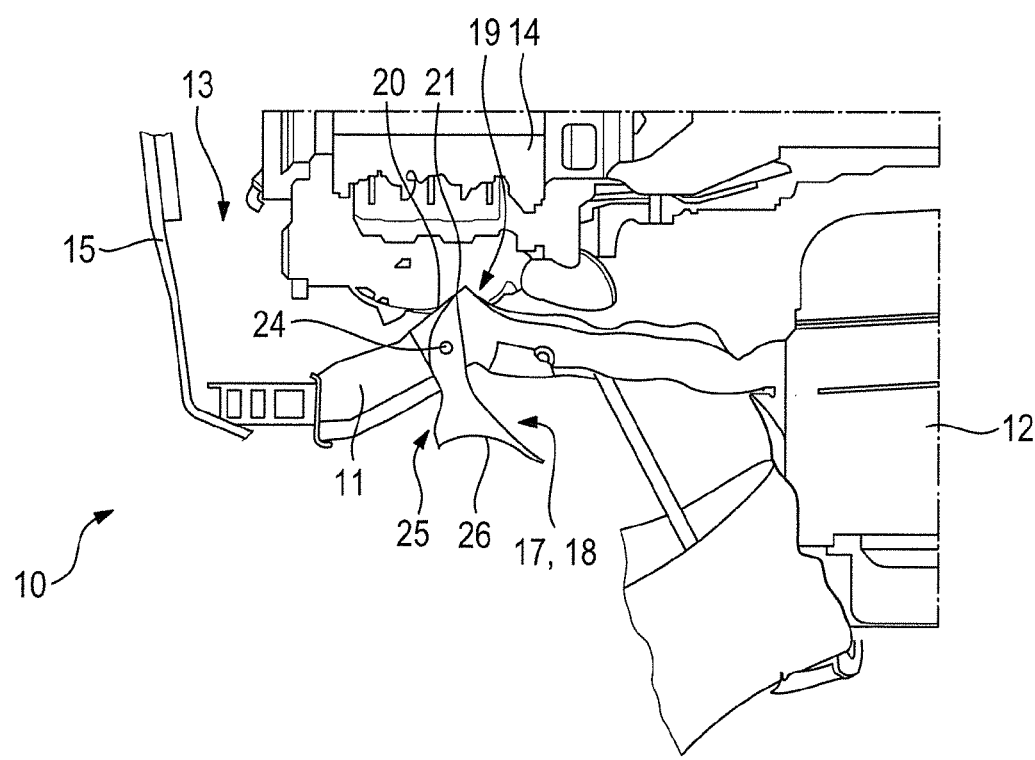
FIG. 5 is the cutout from FIG. 1 in a third state in the event of a partially overlapping frontal collision of the vehicle with a barrier.

In the event of a frontal collision of the vehicle 10 with a barrier (not shown) with a partial overlap on one side of the vehicle, the deflection element 18 that is fastened rotatably to the front longitudinal member 11 overlapped by the frontal collision, is rotatable relative to the respective front longitudinal member 11 from an inoperative position (see FIG. 1), in which the deflection element extends in the longitudinal direction of the front longitudinal member 11, into a collision position (see FIG. 5). FIGS. 3 and 4 show intermediate positions of the deflection element 18.

In this connection, the respective deflection element 18 is rotatable relative to the respective front longitudinal member 11 so that a first portion 19 of the deflection element 18, which portion faces the passenger cell 12 of the vehicle in the inoperative position (see FIG. 1), projects into the engine compartment 13 in the collision position (see FIGS. 4 and 5) and bears against the drive unit 14 in the engine compartment 13 for at least partially converting a longitudinal pulse that acts in the direction of the passenger cell 12 in a frontal collision with partial overlap, or corresponding forces and moments, into a transverse pulse acting on the drive unit 14.

As shown in FIGS. 4 and 5, the side of the front longitudinal member 11 facing the engine compartment 13 has a closed wall 20 in the region of the deflection element 18. Therefore the deflection element 18 bears against the closed wall 20 of the front longitudinal member 11 when displaced from the inoperative position into the collision position and deforms the front longitudinal member 11 into the engine compartment 13. The front longitudinal member 11 can absorb forces and moments during this deformation.

The first portion 19 of the deflection element 18 has a tapered projection 21. A curved contour 22 extends from the projection 21 and faces the engine compartment 13, while a rectilinear contour 23 extends from the projection 21 and faces away from the engine compartment 13 and bounds the projection 21.

As explained above, the respective deflection element 18 of the deflection device 17 is mounted on the respective front longitudinal member 11 for rotation about a vertical axis of rotation 24.

In the event of a frontal collision with partial overlap, the respective deflection element 18 of the deflection device 17 is displaceable from the inoperative position (see FIG. 1) into the collision position (see FIG. 5), namely is rotatable relative to the respective front longitudinal member 11 so that a second portion 25 of the respective deflection element 18 that is opposite the front portion 19 of the deflection element 18 projects in relation to the front longitudinal member 11 on the side facing away from the engine compartment 13 and forms a sliding surface 26 (see FIG. 5) for the barrier (not shown) involved in the frontal collision. The second portion 25 of the deflection element 18 faces away from the passenger cell 12 in the inoperative position (see FIG. 1).

In the illustrated embodiment, the second portion 25 of the deflection element 18 has two tapering projections 27 and 28, with a curved contour extending in between. The contour forms the sliding surface 26 for the barrier (not shown) in the collision position of the respective deflection element 18.

In the inoperative position, a projection 27 formed on the portion 25 of the respective deflection element 18 that faces away from the engine compartment 13 projects out of the front longitudinal member 11, namely on the side that faces away from the engine compartment 13. Therefore, in the event of a frontal collision with partial overlap, the barrier (not shown) comes to bear against the projection 27 to activate the respective deflection element 18. In the event of a frontal collision with partial overlap, the barrier comes to bear against the projection 27 and shifts the respective deflection element 18 from the inoperative position shown in FIG. 1 into the collision position shown in FIG. 5. Thus, the deflection element 18 is rotated about the axis of rotation 24 thereof relative to the front longitudinal member 11 in the direction of the arrow 29 shown in FIG. 3.

In this process, the first portion 19 of the deflection element 18 initially comes to bear against the closed wall 20 of the respective front longitudinal member 11 and, in the event of further rotation of the deflection element 18, deforms the front longitudinal member 11 into the engine compartment 13. As a result, forces and moments are transmitted to the drive unit 14 in the engine compartment 13, and forces and moments acting on the passenger cell 12 in the event of a collision can be reduced.

The front longitudinal member 11 is of open design on the side facing away from the engine compartment 13, and therefore the second portion 25 of the respective deflection element 18, which portion, in the collision position, forms the sliding surface 26 for the barrier (not shown) involved in the frontal collision, can move unobstructed out of the front longitudinal member 11. The front longitudinal member 11 is deformed into the engine compartment 13 via the first portion 19 of the deflection element 18 on the side or wall 20 facing the engine compartment 13.

What is claimed is:

1. A vehicle, comprising:
   a passenger cell;
   front longitudinal members extending forward from the passenger cell;
   an engine compartment between the front longitudinal members;
   a drive unit in the engine compartment; and
   a deflection device for a partially overlapping frontal collision of the vehicle with a barrier, the deflection device having deflection elements fastened respectively to the front longitudinal members and rotatable relative to the respective front longitudinal members about vertical axes of rotation, so that, in the event of the partially overlapping frontal collision, the respective deflection element is rotated relative to the respective front longitudinal member by collision with the barrier from an inoperative position, in which the deflection element extends in a longitudinal direction of the respective front longitudinal member, into a collision position relative to the respective front longitudinal member so that a first portion of the deflection element projects into the engine compartment and at least partially converts a longitudinal pulse from the frontal collision that acts toward the passenger cell, into a transverse pulse that acts toward the drive unit.

2. The vehicle of claim 1, wherein the first portion of the respective deflection element forms a tapering projection, the tapering projection having a curved contour that faces the engine compartment in the inoperative position of the respective deflection element and a rectilinear contour that faces away from the engine compartment in the inoperative position of the respective deflection element.

3. The vehicle of claim 2, wherein the tapering projection of the first portion of the deflection element points toward the passenger cell in the inoperative position.

4. The vehicle of claim 1, wherein each of the respective front longitudinal members has a closed wall in a region of the deflection element on a side facing the engine compartment and an open side facing away from the engine compartment, the deflection element being mounted rotatably in the open side of the respective front longitudinal member so that, when displaced from the inoperative position into the collision position, the first portion of the respective deflection element comes to bear against the wall and deforms the front longitudinal member into the engine compartment in a transverse direction of the vehicle.

5. A vehicle, comprising:
   a passenger cell;
   front longitudinal members extending forward from the passenger cell;

an engine compartment between the front longitudinal members;

a drive unit in the engine compartment; and a deflection device for a partially overlapping frontal collision of the vehicle with a barrier, the deflection device having deflection elements fastened respectively to the front longitudinal members and rotatable about vertical axes of rotation, so that, in the event of the partially overlapping frontal collision, the respective deflection element is rotated by collision with the barrier from an inoperative position, in which the deflection element extends in a longitudinal direction of the respective front longitudinal member, into a collision position relative to the respective front longitudinal member so that a first portion of the deflection element projects into the engine compartment and at least partially converts a longitudinal pulse from the frontal collision that acts toward the passenger cell, into a transverse pulse that acts toward the drive unit, wherein the respective deflection element is rotatable relative to the respective front longitudinal member from the inoperative position into the collision position so that a second portion of the deflection element that is opposite the first portion of the deflection element projects out from a side of the front longitudinal member facing away from the engine compartment and forms a sliding surface for the barrier involved in the frontal collision.

6. The vehicle of claim 5, wherein the second portion of the respective deflection element faces away from the passenger cell when in the inoperative position and has a sloped surface aligned to move the second portion outward and away from the engine compartment in response to the longitudinal pulse from the frontal collision.

7. The vehicle of claim 1, wherein the respective front longitudinal member is open on a side facing away from the engine compartment in a region of the respective deflection element.

8. A vehicle, comprising:

a passenger cell;

front longitudinal members extending forward from the passenger cell;

an engine compartment between the front longitudinal members;

a drive unit in the engine compartment; and a deflection device for a partially overlapping frontal collision of the vehicle with a barrier, the deflection device having deflection elements fastened respectively to the front longitudinal members and rotatable about vertical axes of rotation, so that, in the event of the partially overlapping frontal collision, the respective deflection element is rotated by collision with the barrier from an inoperative position, in which the deflection element extends in a longitudinal direction of the respective front longitudinal member, into a collision position relative to the respective front longitudinal member so that a first portion of the deflection element projects into the engine compartment and at least partially converts a longitudinal pulse from the frontal collision that acts toward the passenger cell, into a transverse pulse that acts toward the drive unit, wherein a second portion of the respective deflection element has tapering projections, a curved contour extending between the tapering projections, the curved contour forming a sliding surface for the barrier when in the collision position.

9. The vehicle of claim 8, wherein, in the inoperative position, a projection of the second portion of the respective deflection element projects in relation to the front longitudinal member on the side of the front longitudinal member that faces away from the engine compartment.

\* \* \* \* \*